United States Patent
Fuller et al.

[11] Patent Number: 6,103,410
[45] Date of Patent: Aug. 15, 2000

[54] START UP OF FROZEN FUEL CELL

[75] Inventors: Thomas F. Fuller, Glastonbury; Douglas J. Wheeler, Tolland, both of Conn.

[73] Assignee: International Fuel Cells Corporation, South Windsor, Conn.

[21] Appl. No.: 09/092,193

[22] Filed: Jun. 5, 1998

[51] Int. Cl.[7] .............................. H01M 8/00; H01M 8/04; H01M 4/86; H01M 10/44

[52] U.S. Cl. ................................. 429/13; 429/22; 429/40; 429/41; 429/52

[58] Field of Search .................................. 429/13, 22, 40, 429/41, 52

[56] References Cited

U.S. PATENT DOCUMENTS 5,879,826   3/1999   Lehman et al. ............................ 429/13

OTHER PUBLICATIONS

Hawley's Condensed Chemical Dictionary, 11th ed., pp. 28–29, 1987 *no month available.

Primary Examiner—Edna Wong
Attorney, Agent, or Firm—M. P. Williams

[57] ABSTRACT

During start up, a fuel cell is warmed to operating temperature by introducing a dilute hydrogen/air mixture into the normal process oxidant channels of the fuel cell where it reacts with a noble metal or noble metal alloy catalyst to produce heat at subflame temperatures. In one embodiment, catalyst is provided in a structure between the cathode and the process oxidant channels; if the structure is not sufficiently hydrophobic to allow the hydrogen/fuel mixture to reach it, such structure may be specially produced with hydrophobic regions to assure ice-free passages; in a structure with sufficient hydrophobic regions, only the catalyst need be added. In embodiments with a hydrophobic cathode, no structural modification is required; or a hydrophilic cathode may be provided with hydrophobic regions.

10 Claims, 2 Drawing Sheets

START UP OF FROZEN FUEL CELL

TECHNICAL FIELD

This invention relates to start up of a frozen fuel cell by the introduction of an oxidant with a small amount of fuel, such as hydrogen, into the normal process oxidant (air) channel on the cathode side of a fuel cell, the oxygen and fuel reacting on a catalyst to produce heat and water, thereby to convert any ice to water and to warm the fuel cell to a temperature at which normal fuel cell operation may begin.

BACKGROUND ART

Several different types of fuel cells are common in the art. In one type, such as phosphoric acid fuel cells and potassium hydroxide fuel cells, the cathode may comprise only hydrophobic layers, and remain unflooded. In another type of fuel cell, referred to as a proton exchange membrane (or PEM) fuel cell, a thin film, flooded electrode consists of a catalyst and a proton exchange resin, or it may use a more conventional gas diffusion electrode having both hydrophobic and hydrophilic zones, and having a catalyst, a proton exchange resin and a hydrophobic polymer, such as TEFLON®. Because of its solid electrolyte, the PEM fuel cell has inherent pressure and safety advantages over cells that utilize liquid acid or alkaline electrolytes, for use in some environments, such as in electrically powered vehicles. Solid electrolyte is stable, can withstand greater pressure differentials, and does not leach from the cell. However, water management is required to keep the anode and the proton exchange membrane wet, and to prevent the cathode from flooding, and thereby blocking the oxidant from reaching the cathode.

When any fuel cell is utilized in an isolated environment, it may be subject to extreme winter temperatures, including temperatures well below 0° C. (+32° F.). In fact, it may be as low as −40° C. (−40° F.) whereas the fuel cell may not operate below about 0° C. (+32° F.).

DISCLOSURE OF INVENTION

Objects of the invention include starting a fuel cell, the temperature of which is below normal operating temperature, starting a fuel cell in which water is frozen, and starting a cold fuel cell without use of external heating means.

According to the present invention, a dilute mixture of fuel and oxygen is passed through the process oxidant flow channel on the cathode side of a fuel cell, the mixture reacting on a catalyst to consume the fuel and form heat, thereby to raise the temperature of the fuel cell. In one embodiment, a dilute mixture of hydrogen, on the order of two volume percent hydrogen in air, is flowed into the air inlet channel of a fuel cell. In one embodiment, in which cathode structures have sufficient regions that are hydrophobic so as to prevent the flooding with water, such regions remain open to gas even when the fuel cell is below freezing temperature, and the dilute fuel/oxygen mixture reacts on the catalyst at the cathode. In other embodiments, useful where the cathodes of the fuel cell are flooded at shut down so that, if frozen, ice substantially blocks any vaporous or gaseous fluid from being able to reach the cathode catalyst when the fuel cell is at a sub-freezing temperature, a small amount of catalyst may be introduced directly into a portion of a hydrophobic porous structure near the cathode whereby the dilute fuel/oxygen mixture will reach sufficient catalyst to create heat necessary to melt the ice, following which, the fuel air mixture may diffuse as usual directly to the catalyst of the entire cathode, and thereby react to produce additional heat. In another embodiment, areas of hydrophobic phase and catalyst may be provided in a cathode so that some catalyst may be reached to initiate heating for the start-up process, even though most of the cathode is blocked with ice.

According to the invention, the amount of fuel in the oxidant stream is limited to prevent flame, explosion and damage from localized heating. For instance, in a system of the invention employing a dilute mixture of hydrogen and air, the hydrogen must be limited to less than four volume percent of the mixture in order to cause the reaction to remain below flammability and explosion limits, as well as to keep the localized temperature below about 90° C. (194° F.) to prevent damage to the fuel cell proper.

The dilute mixture of fuel and oxidant may be pumped into the fuel cell by means of a battery operated pump, or by means of a manually operated pump, as suits the requirements of any utilization of the invention. The source of fuel may comprise pressurized fuel stored in a tank specifically for the purpose, or it may be provided by hydrogen stored from operation of a related fuel processing system, during operation of the fuel cell.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
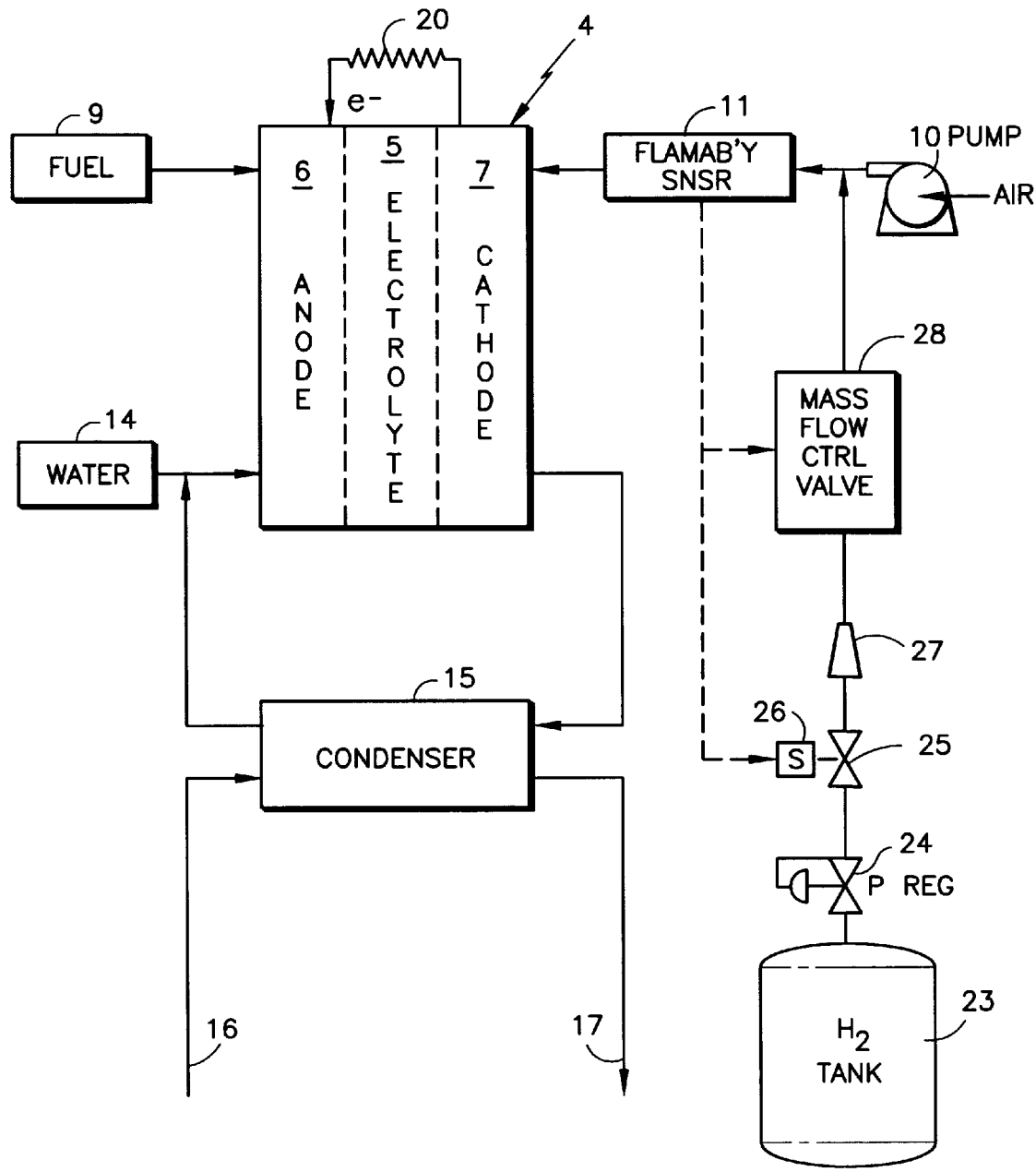
FIG. 1 is a stylized, schematic diagram of a portion of a fuel cell system utilizing the present invention.

In FIG. 1, a fuel cell system of the type in which the present invention may be practiced is shown generically, in a simplified form. In FIG. 1, a single fuel cell 4 is shown although a fuel cell system, as is known, will have many fuel cells disposed adjacent to each other so as to form a stack. The major components of the fuel cell 4 are the electrolyte 5, which in this case is assumed to be a polymeric electrolyte proton exchange membrane, having two major surfaces adjacent to which are an anode 6 and a cathode 7. Fuel, such as hydrogen, is fed to the anode in gaseous form from a source 9, and oxygen, usually provided as air, is supplied to a pump 10 and a flammability sensor 11 (described hereinafter) to the cathode. As is known, the anode of a proton exchange membrane (PEM) fuel cell must be kept cool and wet, and therefore water is provided during operation from a source 14 to the anode side of the fuel cell, water and water vapor being removed from the cathode side of the fuel cell and fed to a condenser 15 where water vapor is cooled, condenses from the gas stream and can be returned to the anode as process water. The condenser may utilize conventional vehicle coolant from an inlet 16 to an outlet 17 to cool the gas stream and so collect water in the condenser 15. The water management system just described is rudimentary and exemplary only, and is not developed further since the nature thereof is irrelevant to the present invention. As is known, the fuel and the oxidant react in the presence of catalysts, typically a noble metal or an alloy of noble metals, so as to consume hydrogen and to produce protons and electrons at the anode. The electrons produced at the anode flow through a load 20 and the protons produced at the anode flow through the electrolyte 5 to the cathode where oxygen, protons, and electrons are combined to produce water and heat.

In accordance with the invention, fuel, such as hydrogen from a tank 23 is passed through a pressure regulator 24, a shutoff valve 25 which may be operated by a solenoid 26, a flow restriction orifice 27 and a mass flow control valve 28 to mix with air from the pump 10 to provide a dilute fuel/air mixture to the cathode side of the fuel cell 4. The flammability sensor 11 may be a B-Ultima-31-B-Y-D-O-041-1-T made by MSA of Pittsburgh, Pa. It provides a signal that is used to adjust the mass control valve so as to ensure that the hydrogen does not exceed about 4 volume percent of the air fuel mixture entering the cathode. In addition, should the flammability sensor sense the presence of a sufficient amount of hydrogen so that flame or explosion is likely, it can cause the solenoid 26 to close the shutoff valve 25. In a typical utilization of the invention, a vehicle on-board computer will program the solenoid 26 to open the valve 25 when the vehicle is to be started, will monitor the flammability of the air/fuel mixture and will control the mass flow control valve so that the fuel air mixture will remain sufficiently dilute to avoid overheating of the cathode, flames, and explosions.

Figure 2:
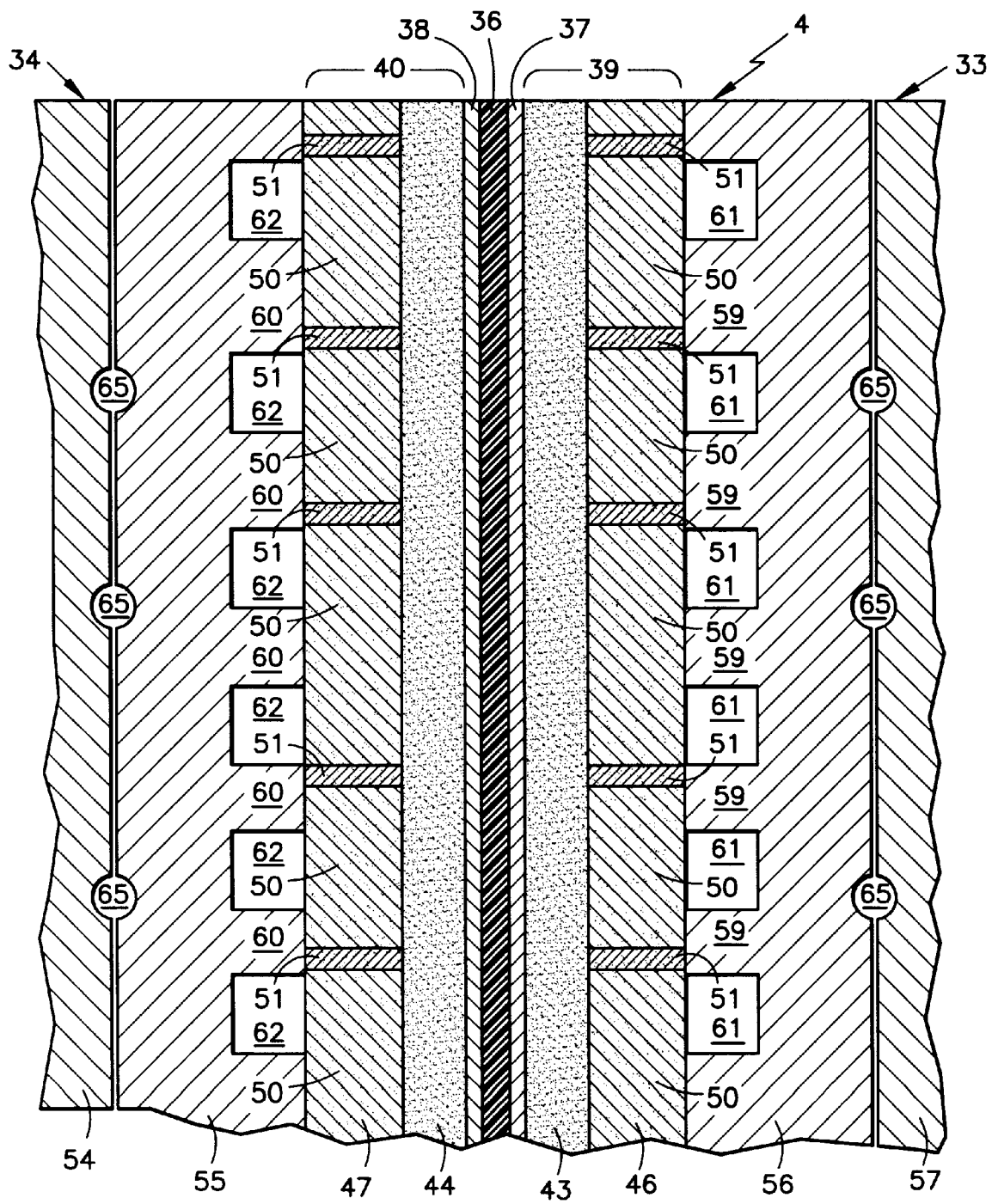
FIG. 2 is a partial cross section of fuel cells of an embodiment of the invention providing additional catalyst in a bi-phase layer of a porous support plate.

Referring to FIG. 2, one embodiment of a fuel cell 4 is shown sandwiched between adjacent fuel cells 33, 34. Each fuel cell comprises a solid polymeric electrolyte membrane 36 with a cathode 37 and an anode 38 disposed on opposite major surfaces thereof. The anode and cathode comprise porous layers of catalysts such as noble metals or alloys of noble metals, as is well known. The anode and cathode 37, 38 are each supported by a corresponding porous support plate 39, 40, each of which may include a biphase layer 43, 44 having both hydrophilic phase and hydrophobic phase, supported on a porous carbon-carbon, fibrous composite substrate 46, 47 having about 65% porosity to about 75% porosity. In each of the substrates 46, 47 there are regions 50 (shown with sparse cross hatching) that are hydrophobic, which restrict liquid absorption and facilitate gas transfer through the substrates 46, 47. There are also smaller regions 51 (marked with dense cross hatching) which are hydrophilic and promote water transport. Except for the provisions of the present invention, described hereinafter, the materials and the manner of preparation of the porous support plates 39, 40 are described in a commonly owned copending U.S. patent application Ser. No. 09/260,583, filed Apr. 15, 1998.

The outermost structure of each fuel cell is a water transport plate 54–57, each of which has a configuration on one side including projections 59 surrounded on all sides by grooves 61, much in the same fashion as a waffle iron, the grooves 61 forming channels for the oxidant (air), and on the other side, projections 60 are surrounded by grooves 62, the grooves 62 forming channels for the fuel gas (hydrogen). Slots formed in the opposite surfaces of the water transport plates 54–57, together with similar slots of adjacent water transport plates form water flow channels 65 on the cathode side of the fuel cell 4 and water flow channels 66 on the anode side of the fuel cell 33, and on the anode side of the fuel cell 4 and cathode side of the fuel cell 34. The description of the fuel cells in FIG. 2 thus far is essentially that of the aforementioned copending application.

In accordance with one embodiment of the invention, a small amount of catalyst is dispersed throughout the biphase layer 43 adjacent the cathode. For instance, a few hundreds to a few tenths of a milligram of platinum per square centimeter within a platinum-carbon catalyst (or other suitable noble metal or noble metal alloy) may be dispersed by conventional methods throughout the biphase layer 43 upon manufacture, using the method of commonly owned U.S. Pat. No. 4,233,181, or any other suitable method. The biphase layers 43, 44 have hydrophilic pocket and hydrophobic pockets dispersed throughout, so there is assurance that a significant portion of the added catalyst will be reached by the dilute fuel/air mixture, and cause the mixture to react, combusting the fuel and thereby warming the cell.

If operation of the fuel cell is such that the cathode is saturated with water during shutdown, and thus covered with ice when frozen, then catalysts can be provided in hydrophobic regions adjacent the process oxidant channel so as to permit oxygen contact therewith, as described in FIG. 2. In other embodiments, such as may be utilized with a fuel cell disclosed in commonly owned U.S. Pat. No. 5,503,944, where there is no porous support plate such as the porous support plates 39, 40 in the foregoing embodiment, regions may be established in the cathode substrate 18 which are hydrophobic and thus will be permeable to gas even when the fuel cell is frozen. If necessary, additional catalyst may be provided in the hydrophobic regions. Also, the fuel cell of commonly owned U.S. Pat. No. 4,769,297 may practice the invention by providing hydrophobic pockets along with the catalyst in the cathode substrate layer 46.

As described hereinbefore, the cathodes of phosphoric acid fuel cells and of potassium hydroxide fuel cells are hydrophobic, so the invention may be practiced by simply flowing the dilute fuel air mixture into the air passages of the fuel cell. Similarly, in any other embodiment where ice does not block the passage of the dilute fuel/air mixture to the cathode catalyst, the dilute fuel/air mixture need only be introduced into the process oxidant fuel passage in order to warm up the fuel cell to operating temperature.

Of course, it is understood that care must be taken to avoid localized heating, and possible damage to the fuel cell components. Furthermore, once a temperature is reached at which the fuel cell can operate, the fuel cell can be further warmed by introducing the normal reactants and causing current to flow through a controlled, resistive load, thereby to warm the fuel cell still further, to normal operating temperature.

The aforementioned patent application and the aforementioned patents are all incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. In a fuel cell having a cathode containing a catalyst to assist in the overall cell reaction of hydrogen with oxygen to produce electricity and water, the fuel cell having process oxidant channels in which the oxygen or air is transported to the cathode side of the fuel cell, a method of warming the fuel cell during start up of operation, comprising:

flowing a stream of oxygen or air into said process oxidant channels of said fuel cell; and introducing a small amount of hydrogen from a source of hydrogen into said stream of oxygen or air to provide a dilute mixture of hydrogen and oxygen or air in said process oxidant channels of the fuel cell.

2. A method according to claim 1 further comprising:

monitoring the concentration of hydrogen in the mixture and adjusting the concentration to avoid flames and explosions.

3. A method according to claim 1 further comprising:

monitoring the concentration of hydrogen in the mixture and adjusting the concentration of hydrogen in the mixture to assure that localized heating will not damage the fuel cell.

4. The method according to claim 1 further comprising, before said step of providing:

introducing a small amount of catalyst in a hydrophobic region of a structure between said cathode and said process oxidant channels.

5. A method according to claim 1 further comprising, before said step of introducing:

introducing a small amount of catalyst and a hydrophobic polymer in regions of a structure between said cathode and said process oxidant channels.

6. A method according to claim 1 further comprising, before said step of introducing:

providing hydrophobic regions in said cathode.

7. A fuel cell comprising:

an electrolyte;

a cathode on one side of said electrolyte having a catalyst associated therewith;

a process oxidant channel for delivery of process oxygen or air to the cathode side of said fuel cell;

a source of hydrogen;

a source of oxygen;

means operative upon start up of said fuel cell to flow a stream of oxygen or air from said source of oxygen to said process oxidant channel; and means operative upon start up of said fuel cell to introduce a small amount of hydrogen from said source into said stream of oxygen or air, thereby to provide a dilute hydrogen/oxygen mixture or hydrogen/air mixture to the cathode side of said fuel cell, whereby the reaction thereof on said catalyst will warm said fuel cell.

8. Apparatus according to claim 7 further comprising means for adjusting the concentration of hydrogen in said dilute hydrogen/oxygen mixture, whereby to avoid flame and explosion in said fuel cell.

9. A fuel cell according to claim 7 further comprising:

means for adjusting the concentration of hydrogen in said dilute hydrogen/oxygen mixture or hydrogen/air mixture so as to prevent localized heating which could damage said fuel cell.

10. A fuel cell comprising:

an electrolyte;

a cathode on one side of said electrolyte having a first catalyst associated therewith;

a process oxidant channel for delivery of process oxygen to the cathode side of said fuel cell;

a structure disposed between said cathode and said process oxidant channel and having a hydrophobic region with a second catalyst of noble metal or noble metal alloy additional catalyst dispersed therein, said hydrophobic region being in gas communication with said channel;

a source of hydrogen;

a source of oxygen or air;

means operative upon start up of said fuel cell to flow a stream of oxygen or air from said source of oxygen or air to said process oxidant channel; and means operative upon start up of said fuel cell to introduce a small amount of hydrogen from said source into said stream of oxygen or air, thereby to provide a dilute hydrogen/oxygen mixture or hydrogen/air mixture to the cathode side of said fuel cell, whereby the reaction thereof on said second catalyst will generate heat to warm said fuel cell.

\* \* \* \* \*